United States Patent
Ham (10) Patent No.: US 7,755,821 B2
(45) Date of Patent: Jul. 13, 2010

(54) PHOTON LOGIC GATES

(75) Inventor: Byoung Seung Ham, Gyeonggido (KR)

(73) Assignee: INHA-Industry Partnership Institute, Incheon (KR)

( * ) Notice: Subject to any disclaimer, the term of this patent is extended or adjusted under 35 U.S.C. 154(b) by 482 days.

(21) Appl. No.: 11/912,314

(22) PCT Filed: Mar. 7, 2007

(86) PCT No.: PCT/KR2007/001130

§ 371 (c)(1), (2), (4) Date: Oct. 23, 2007

(87) PCT Pub. No.: WO2008/050938

PCT Pub. Date: May 2, 2008

(65) Prior Publication Data

US 2010/0002276 A1    Jan. 7, 2010

(30) Foreign Application Priority Data

Oct. 24, 2006  (KR) .................... 10-2006-0103494

(51) Int. Cl.
*G02F 3/00* (2006.01)
(52) U.S. Cl. ..................................... 359/108
(58) Field of Classification Search ................. 359/107, 359/108
See application file for complete search history.

(56) References Cited

U.S. PATENT DOCUMENTS 6,628,453 B2 * 9/2003 Ham .......................... 359/326

(Continued)

FOREIGN PATENT DOCUMENTS

JP    09-096845    4/1997

(Continued)

OTHER PUBLICATIONS

Xinliang Zhang, Ying Wang, Junqiang Sun, Deming Liu, and Dexiu Huang, "All-optical and gate at 10 Gbit/s based on cascaded single-port-coupled SOAs," Optics Express, Feb. 9, 2004, pp. 361-366, vol. 12, No. 3.

(Continued)

*Primary Examiner*—Alessandro Amari
(74) *Attorney, Agent, or Firm*—Adam K. Sacharoff; Much Shelist (57) ABSTRACT

A system, method, and apparatus for photon logic gates based on quantum switch, where a single or multiple quantum switches are utilized for dark resonance interactions in which three-color lasers interact with a four-level or five-level non-linear optical medium composed of three ground states and one or two excited states through nondegenerate four-wave mixing processes. The photon logic mechanism is based on combination of single or multiple dark resonance-induced two-photon coherence swapping among the three closely spaced ground states through optical transitions via a common excited state. The two-photon coherence induced on the ground states is optically detected via nondegenerate four-wave mixing processes. The nondegenerate four-wave mixing generation is enhanced owing to dark resonance or electromagnetically induced transparency. The gating time and bandwidth of the present photon logic gate method is not limited by population relaxation time or carrier's lifetime, but phase decay time, where the phase decay time in general much faster than the population decay time in solids or semiconductors.

22 Claims, 4 Drawing Sheets

U.S. PATENT DOCUMENTS

2002/0021474 A1* 2/2002 Ham .................... 359/181

FOREIGN PATENT DOCUMENTS

| JP | 2005-165123 | 6/2005 |
|---|---|---|
| KR | 1020010113407 A | 12/2001 |

OTHER PUBLICATIONS

K. L. Hall and K. A. Rauschenbach, "100-Gbit/s bitwise logic," Optics Letters, Aug. 15, 1998, pp. 1271-1273, vol. 23, No. 16.

Makoto Naruse, Hiroyuki Mitsu, Makoto Furuki, Izumi Iwasa, Yasuhiro Sato, Satoshi Tatsuura, Minquan Tian, and Fumito Kubota, "Terabit all-optical logic based on ultrafast two-dimensional transmission gating," Optics Letters, Mar. 15, 2004, pp. 608-610, vol. 29, No. 6.

B. S. Ham, "Experimental demonstration of all-optical 1×2 quantum routing," Applied Physics Letters, Aug. 9, 2004, pp. 893-895, vol. 85, No. 6.

Byoung S. Ham and Philip R. Hemmer, "Coherence Switching in a Four-Level System: Quantum Switching," Physical Review Letters, May 1, 2000, pp. 4080-4083, vol. 84, No. 18.

Stephen E. Harris, "Electromagnetically Induced Transparency," Physics Today, Jul. 1997, pp. 36-42.

B. S. Ham, M. S. Shahriar, and P. R. Hemmer, "Enhanced nondegenerate four-wave mixing owing to electromagnetically induced transparency in a spectral hole-burning crystal," Optics Letters, Aug. 1, 1997, pp. 1138-1140, vol. 22, No. 15.

B. S. Ham, P. R. Hemmer, and M. S. Shahriar, "Efficient phase conjugation via two-photon coherence in an optically dense crystal," Physical Review A, Apr. 1999, pp. R2583-R2586, vol. 59, No. 4.

B. S. Ham, M. S. Shahriar, M. K. Kim, and P. R. Hemmer, "Spin coherence excitation and rephasing with optically shelved atoms," Physical Review B, Nov. 1, 1998, pp. R11 825-R11 828, vol. 58, No. 18.

B. S. Ham, M. S. Shahriar, and P. R. Hemmer, "Enhancement of four-wave mixing and line narrowing by use of quantum coherence in an optically dense double-Λ solid," Optics Letters, Jan. 15, 1999, pp. 86-88, vol. 24, No. 2.

P. R. Hemmer, D. P. Katz, J. Donoghue, M. Cronin-Golomb, M. S. Shahriar, and P. Kumar, "Efficient low-intensity optical phase conjugation based on coherent population trapping in sodium," Optics Letters, May 1, 1995, pp. 982-984, vol. 20, No. 9.

Maneesh Jain, Hui Xia, G. Y. Yin, A. J. Merriam, and S. E. Harris, "Efficient Nonlinear Frequency Conversion with Maximal Atomic Coherence," Physical Review Letters, Nov. 18, 1996, pp. 4326-4329, vol. 77, No. 21.

Lene Vestergaard Hau, S. E. Harris, Zachary Dutton, and Cyrus H. Behroozi, "Light speed reduction to 17 metres per second in an ultracold atomic gas," Nature, Feb. 18, 1999, pp. 594-598, vol. 397.

A. V. Turukhin, V. S. Sudarshanam, M. S. Shahriar, J. A. Musser, B. S. Ham, and P. R. Hemmer, "Observation of Ultraslow and Stored Light Pulses in a Solid," Physical Review Letters, Jan. 14, 2002, pp. 023602-1-023602-4, vol. 88, No. 2.

S. E. Harris, J. E. Field, and A. Imamoglu, "Nonlinear Optical Processes Using Electromagnetically Induced Transparency," Physical Review Letters, Mar. 5, 1990, pp. 1107-1110, vol. 64, No. 10.

Cunkai Wu and Yang Zhao, "High-efficiency double phase conjugation in a Ce-doped strontium barium niobate crystal," Optic Letters, Jan. 15, 1993, pp. 98-100, vol. 18, No. 2.

Byoung S. Ham, "Potential applications of dark resonance to subpicosecond optical switches in hyper-terahertz repetition rates," Applied Physics Letters, May 28, 2001, pp. 3382-3384, vol. 78, No. 22.

* cited by examiner

PHOTON LOGIC GATES

TECHNICAL FIELD

The present invention relates to a method and apparatus for photon logic gates using quantum switch(es).

BACKGROUND ART

A logic gate is generally used for logical operations in data processing using one more logic inputs to produce a single output. The logic is normally referred to Boolean logic such as NOT, OR, NOR, XOR, XNOR, AND, and NAND. For an electronic central processing unit (CPU) the logic gate acts as a basic unit to perform computing operations. Due to the increasing demand for faster processing ability, the CPU has been exponentially evolved up to now 3.7 GHz in 2006 according to the Moore's law since mid 1970s. However, there have been fundamental limitations in electronic transistors in such a way of gate-width dependent switching time and electromagnetic-interference-limited operational bandwidth. To overcome such fundamental limitations, optical logic gates have been studied for last several decades. On the contrary, as a counterpart of electronic carriers, optical signals are free from the electromagnetic interference and the size-dependent speed limitation. Moreover parallel processing is an intrinsic benefit. Recently, various types of high-speed all-aptical logic gates for Boolean NOT, OR, NOR, AND, XOR, and NAND have been demonstrated using semi-conductor-optical-amplifiers (SOAs) and erbium doped fiber amplifiers (EDFAs). A computing device, however, must satisfy certain requirement of practicality such as lower power consumption, smaller device size, and higher speed. Since 1980's several types of Boolean algebra-based optical logic gates have been proposed and demonstrated. A bulky optical logic gate using linear optics such as mirrors and beam splitters has been applied. The linear optics based optical gate is of course lacks efficiency due to bulky size.

Recently nonlinear optics-based optical logic gates have been intensively studied. In this area, SOA is the most useful component to form the optical logic gate. By introducing SOAs to optical logic gates the device size and power consumption has been extremely reduced down. The physics of the SOA-based optical logic gate is using refractive index change occurred by electric current. In the conventional optical switching technologies, the time needed for the refractive index change is an absolute constraint to the switching time. Here, the refractive index change is limited by the carriers' redistribution time. Therefore, the conventional optical switching time should be fundamentally limited by the carriers' lifetime, where it is sub-nanosecond. Even though a SOA offers relatively low power consumption such as ~100 mW (Optics Letters, Vol. 23, pp. 1271-3 (1997)), total estimated power and size for a potential optical CPU composed of just million units of SOA reaches at several ~100 kW and several square meters, respectively, which is never practical. Here it should be noted that the up-to-date electronic CPU reaches at 3.7 GHz in clock speed, contains near 300 million transistors, and needs about 100 W power consumption: www.intel.com/research/silicon/micron.htm On the other hand, optical switching effect can be obtained by using a nonlinear quantum phenomenon, electromagnetically induced transparency (EIT), which uses two-color electromagnetic fields for rapid refractive index change owing to quantum interference in an optically resonant medium composed of three energy levels or more: Harris, Physics Today, Vol. 50, p. 36 (1995). The energy level structure of the resonant optical medium satisfies two-closely spaced ground states and an excited state, two-closely spaced excited states and a ground state, or an arbitrarily spaced cascade-type system. The quantum interference-based refractive index change can result in strong spin coherence excitation on the closely spaced states and absorption cancellation. Due to the abrupt absorption spectrum change, a slow light phenomenon is induced due to the steep dispersion slope across the resonance frequency: Turukhin et al., Physical Review Letters, Vol. 88, p 023602 (2002).

In the case of EIT, the time needed for the refractive index change is not limited by the carriers' lifetime or population relaxation time, but dependent on the phase decay time, where the phase decay time is normally much shorter than the population relaxation time in solids. Specifically, the phase decay time is hundreds times faster than the carrier's lifetime in most ion-doped crystals such as Pr 3-doped $Y_2SiO_5$, so that ultrahigh-speed optical processing can be obtained: quantum switching (Ham, Applied Physics Letters, Vol. 85, pp. 893-5 (2004)). The two-photon coherence excitation between the closely spaced ground states is optically detected by using nondegenerate four-wave mixing processes. The resulting intensity of the nondegenerate four-wave mixing signal can be stronger than that of the original input signal: Hemmer et al., Optics Letters, Vol. 20, pp. 982-4 (1995)).

When the two-closely-spaced ground states are replaced by three-closely-spaced states and three-color optical fields are resonantly applied to the common excited state, a quantum switching phenomenon is obtained: Ham, Physical Review Letters, Vol. 84, pp. 4080-3 (2000). The physics of the quantum switch is the optically controllable spin-coherence swapping, and the optical switching time is much faster than conventional refractive index-based optical switch. This fact was experimentally demonstrated using a $Pr^{3+}$-doped $Y_2SiO_5$ (Pr:YSO) for 100 fold decreased optical switching time: Ham, Applied Physics Letters, Vol. 85, pp. 893-5 (2004).

DISCLOSURE OF THE INVENTION

The primary object of the present invention is to provide a method and an apparatus of photon logic gates based on quantum switching phenomenon. The photon logic gates should overcome limitations of the conventional optical logic gates in operational speed and size. The main feature of the photon logic gates is using quantum optics of EIT and quantum switch for multiple gate function in one physical gate composed of three (four)-color lasers interacting with a nonlinear optical medium via optical waveguides or free space. As shown in the quantum switch (Ham, U.S. Pat. No. 6,628,453), the operational bandwidth of the present photon logic gates is not limited by the population relaxation time or carrier's lifetime. Main advantage of the present invention is not only for all-optical digital processing but also for quantum interface in a quantum network composed of quantum computers. Briefly described, a system of the photon logic gates of the present invention is provided by a single or multiply connected quantum switches composed of nonlinear optical medium and at least four coherent laser beams. The nonlinear optical medium of the quantum switch is composed of at least four-energy levels. Three of them should be closely spaced on the ground states, and the last one should be an excited state. The frequencies of the laser beams of A, C, and S are resonant respectively to the transitions from the three ground states $|1\rangle$, $|2\rangle$, and $|3\rangle$ to the excited state $|4\rangle$ of the nonlinear optical medium: see FIGS. 1 and 2. The laser beam R is used as a probe for nondegenerate four-wave mixing processes to generate the outputs Q1 or Q2. The nondegenerate four-wave mixing output Q1 and/or Q2 can be used as an input(s) to the second/third nonlinear medium to configure a photon logic gate. The output direction of the Q1 and Q2 is physically separated, so that the quantum switch acts as an optical router: Ham, Applied Physics Letters Vol. 85, pp. 893-895 (2004). Each laser beam can be guided by an optical waveguide made of hetero-structured quantum wells, photonic bandgap crystals, silicon on insulator, or surface plasmon. The optical waveguide is not part of the current invention. By connecting two quantum switches in series or in parallel it performs the Boolean logic: NOT, NAND, AND, OR, XOR, and NOR. The photon logic gates can be extended for scalability purposes by an optical waveguide, and the traveling time between two photon logic gates is negligible.

BRIEF DESCRIPTION OF THE DRAWINGS

The accompanying figures illustrate several embodiments of the present invention, and together with the descriptions, serve to explain the principles of the invention. The drawings are for only for the purpose of illustrating a preferred embodiment of the invention and are not to be construed as limiting the invention.

FIG. 1 is very similar to the quantum switch: U.S. Pat. No. 6,628,453.

FIG. 3 shows both experimental (a, b) and theoretical (c, d) data of FIG. 2: Quantum switching (routing). The spatial direction of the output beams Q1 and Q2 are determined by the phase matching conditions of the laser beams, in which the direction is either the same each other or different.

FIG. 4 illustrates a schematic diagram of a photon logic gate, NOR, of the present invention. Letter QS stands for the quantum switch comprised of a nonlinear optical medium 107, which is connected by optical waveguides used for the laser beams R, S, C, A, Q1 (or X), and Q2 (or Y) in FIG. 1, and also satisfies FIG. 2.

FIG. 5 illustrates a schematic diagram of a photon logic gate, AND, of the present invention. Letter QS stands for the quantum switch comprised of a nonlinear optical medium 107 which is connected by optical waveguides used for the laser beams R, S, C, A, Q1 (or X), and Q2 (or Y) in FIG. 1, and also satisfies FIG. 2.

BEST MODE FOR CARRYING OUT THE INVENTION

Figure 1:
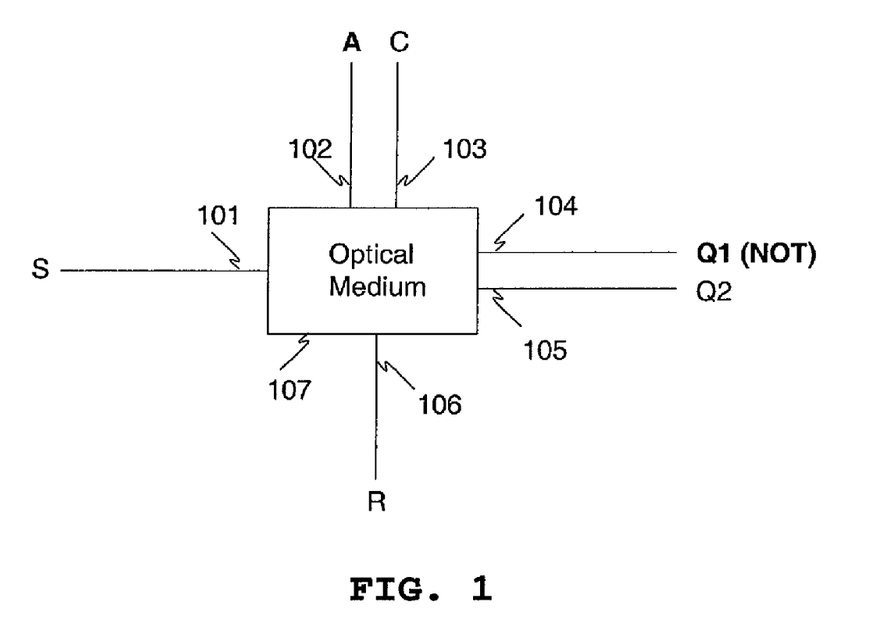
FIG. 1 illustrates a block diagram of a photon logic gate, NOT, of the present invention.
Figure 2:
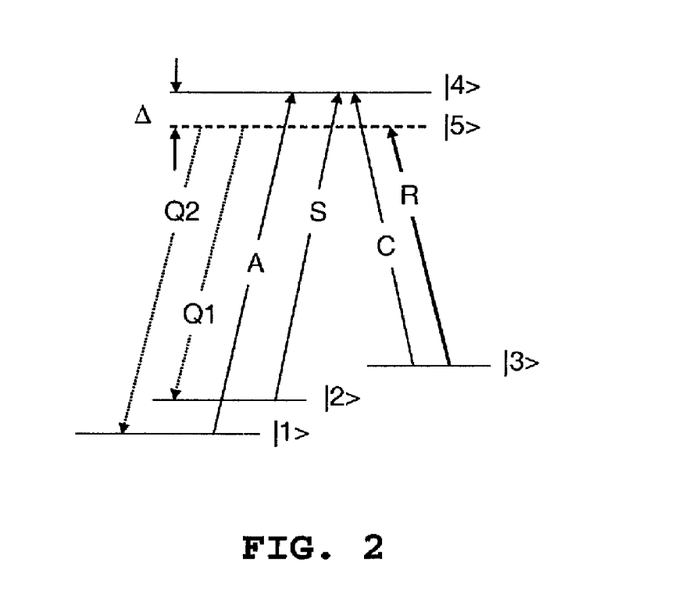
FIG. 2 shows an energy level diagram of the nonlinear optical medium 107 of FIG. 1, where the frequency difference among the ground states are much smaller than the transition frequency between the ground states and the excited states. The excited energy state |5> can be virtual, real, or the same as the state |4> depending on the value of the frequency detuning $\Delta$. Letters R, S, C, A, Q1, and Q2 stand for laser beams at different frequencies of $\omega_R$, $\omega_S$, $\omega_C$, $\omega_A$, $\omega_{Q1}$, and $\omega_{Q2}$, respectively.

To gain a better understanding reference is now made to the drawings which illustrate the preferred embodiments of the invention. FIG. 1 describes a photon logic gate, NOT, where a single quantum switch is used. Letters R, S, C, A, Q1, and Q2 stand for laser beams at different frequencies of $\omega_R$, $\omega_S$, $\omega_C$, $\omega_A$, $\omega_{Q1}$, and $\omega_{Q2}$, respectively. The numbers from 101 to 106 stand for both laser beams and optical waveguide used for the laser beams. The number 107 stands for a nonlinear optical medium. According to the quantum switch theory (Physical Review Letters. Vol. 84, pp. 4080-4083 (2000), and Applied Physics Letters, Vol. 78, pp. 3382-3384 (2001); Applied Physics Letters, Vol. 85, pp. 893-895 (2004); U.S. Pat. No. 6,628,453 (2003)), the output Q1 (104) is always OFF whenever the logical input beam A (102) is switched ON, and vice versa. Here it should be noted that the laser beams C and R may be continuous if the detuning $\Delta$ is not zero: the detuning $\Delta$ is shown in FIG. 2. If the detuning $\Delta$ is equal to zero, then the laser beams C (103) and R (106) cannot be continues but must be pulsed and synchronized to the control beam C (102). TABLE 1 shows the resulting Boolean algebra NOT of FIG. 1.

TABLE 1

| S | A | Q1 (NOT) | Q2 |
|---|---|----------|----|
| 1 | 0 | 1        | 0  |
| 1 | 1 | 0        | 1  |

Here the excited energy state |5> is either virtual or real. For the real state of |5> with nonzero detuning $\Delta$, the pulsed nondegenerate four-wave mixing processes have been demonstrated: Ham, Optics Letters, Vol. 24, pp. 86-88 (1999).

FIG. 2 shows an energy level diagram of the nonlinear optical medium 107 of FIG. 1. In general this kind of energy level structure is typical in a rare-earth doped crystal such as $Pr^{3+}$ doped $Y_2SiO_5$ (YSO). Here, the lower three energy levels are resulted from the hyperfine splitting in rare-earth doped crystals. The energy level structure of FIG. 2 can also be obtained artificially by multiply coupling semiconductor quantum wells or quantum dots. The nonlinear optical medium 107 of FIG. 1 has either four energy states; |1>, |2>, |3> and |4> or five energy states; |1>, |2>, |3>, |4> and |5>. The state |4> of FIG. 2 is higher than |1>, |2> and |3> in energy. In fact the nonlinear optical medium 107 of FIG. 1 may have more than five energy levels, but only the mentioned energy levels shown in FIG. 2 contribute to the photon logic mechanism of the present invention. The detuning $\Delta$ of FIG. 2 is an offset of the laser beam R at $\omega_R$ from the resonance frequency from the state |3> to |4>, i.e., $\Delta=\omega_{43}-\omega_R$, where $\omega_{43}=\omega_4-\omega_3$. The laser output beam Q1 at frequency $\omega_{Q1}$ is generated by nondegenerate four-wave mixing processes, where three laser interactions of C, S, and R are involved at frequencies $\omega_C$, $\omega_S$, and $\omega_R$, respectively, with the nonlinear optical medium. Similarly, the laser output Q2 at frequency $\omega_{Q2}$ is generated by nondegenerate four-wave mixing processes involving three laser interactions of A, S, and R at $\omega_A$, $\omega_S$, and $\omega_R$, respectively. The propagation directions $k_{Q1}$ and $k_{Q2}$ of the nondegenerate four-wave mixing signals Q1 and Q2 of FIG. 2 are determined by the phase matching conditions, respectively: $k_{Q2}=k_A-k_S+k_R$; $k_{Q1}=k_C-k_S+k_R$. Here, the nondegenerate four-wave mixing generation is strongly enhanced owing to dark resonance or EIT. To understand the enhancement of the nondegenerate four-wave mixing processes, more detail explanation is presented below.

Enhancement of nondegenerate four-wave mixing processes was suggested by Harris in Physical Review Letters, Vol. 64, pp. 1107-1110 (1991) and were demonstrated experimentally in atomic gases by Jain et al. in Optics Letters Vol.

18, pp. 98-101 (1993) and in ion-doped solid by Ham et al. in Optics Letters, Vol. 22, pp. 1138-1140 (1997). Signal amplifications and high-conversion efficiency using atomic gases for nondegenerate four-wave mixing processes were also experimentally demonstrated by Hemmer at al. in Optics Letters, Vol. 20, pp. 982-984 (1995) and Jain et al. in Physical Review Letters, Vol. 77, pp. 4326-4329 (1996), respectively. The high-conversion efficiency of nondegenerate four-wave mixing processes was also experimentally demonstrated in ion-doped solids by Ham et al. in Physical Review A, Vol. 59, pp. R2583-2586 (1999). The enhancement of nondegenerate four-wave mixing processes is based on reduced first-order linear susceptibility and enhanced third-order nonlinear susceptibility owing to destructive and constructive quantum interference, respectively.

To show more detail relations between the laser inputs and the nondegenerate four-wave mixing output signals, coherence swapping should be understood. To see the coherence excitation in FIG. 2, density matrix ρ must be discussed. The density matrix has been a useful tool to show a system's macroscopic ensemble; *Quantum optics*, Cambridge Uniersity Press, New York, N.Y. (1997), Edited by Scully and Zubairy. In FIG. 2, two laser beams C and S can induce two-photon coherence $\rho_{23}$ on the transition |2>-|3> via the excited state |4>. Similarly two lasers beams A and S can also induce two-photon coherence $\rho_{13}$ on the ground state transition |1>-|3> via the excited state |4>. Especially, the two-photon coherence is strongly enhanced if dark resonance or EIT involves. Here, dark resonance or EIT is the same physical phenomenon, but the term EIT roots in the absorption cancellation so that a resonant electromagnetic field can pass through an optically thick medium without experiencing any absorption.

Figure 3:
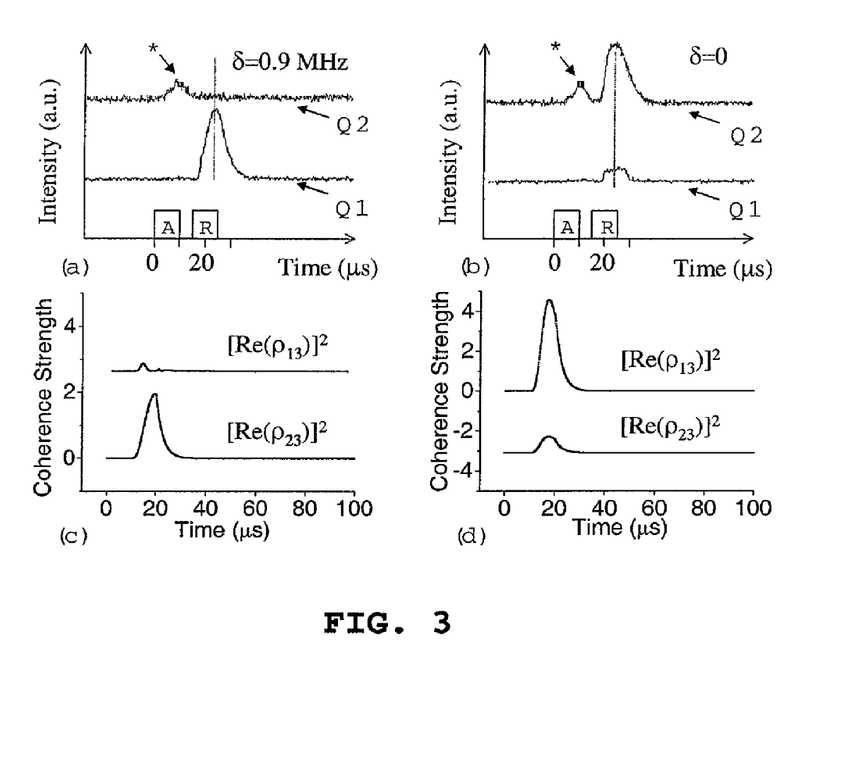

FIG. 3 shows both theoretical and experimental data of the quantum switching (routing) using $Pr^{3+}$:YSO based on FIG. 2 for the detuning Δ=0: The δ stands for the detuning of the laser beam A from the resonance frequency of the transition |1>-|4>. As seen in FIG. 3, the intensity of the two-photon coherences $Re\rho_{13}$ and $Re\rho_{23}$ is swapped each other according to the laser action of A: The two-photon coherence can be optically detected using the laser beam R resulting in generation of nondegenerate four-wave mixing signal Q1 or Q2. The experimental data of the nondegenerate four-wave mixing signals in FIGS. 3a and 3b match well the two-photon coherence intensity $[Re\rho_{12}]^2$, which has been calculated theoretically: Ham et al. in Physical Review A, Vol. 59, R2583-R2586 (1999), Physical Review Letters. Vol. 84, pp. 4080-4083 (2000), and Applied Physics Letters, Vol. 78, pp. 3382-3384 (2001); Applied Physics Letters, Vol. 85, pp. 893-895 (2004); U.S. Pat. No. 6,628,453 (2003).

Figure 4:
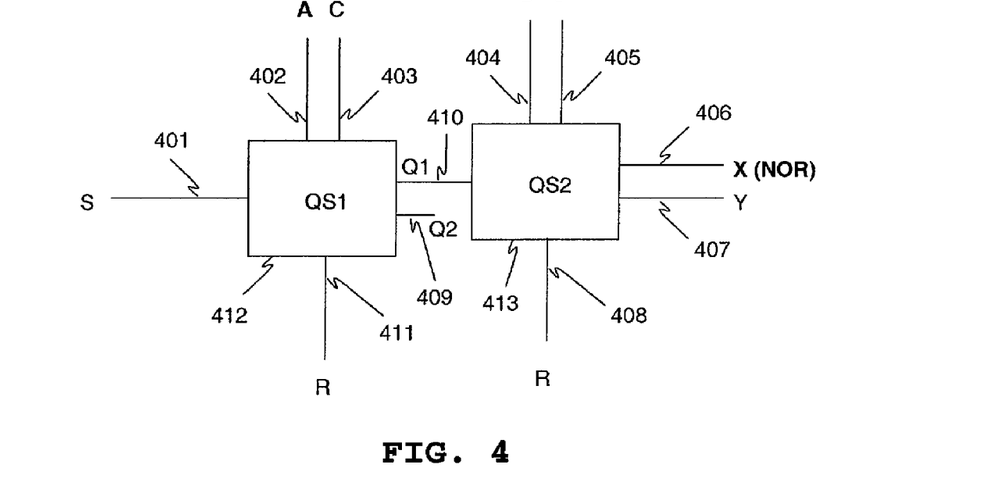

FIG. 4 describes a photon logic gate, NOR, where two quantum switches are connected in series. Here, the output Q1 (410) of the left (first) quantum switch QS1 (412) is fed into the right (second) quantum switch QS2 (413) as an input (see S in FIG. 1). Two logical input laser beams A (402) from QS1 and B (404) from QS2 perform optical logic inputs and result in Boolean algebra NOR at the output X (406). As mentioned above the laser beams R (408, 411) applied to each quantum switch can be continues wave if Δ16 0. If Δ=0, R muse be pulsed and synchronized to the input logic laser A (402). Both input laser beams A (402) and B (404) must be synchronized, too. TABLE 2 shows the Boolean algebra of NOR resulted in the outputs X (406) by the combinations of two logic inputs A (402) and B (404).

TABLE 2

| S | A | B | Q1 | Q2 | X (NOR) | Y |
|---|---|---|----|----|---------|---|
| 1 | 0 | 1 | 1  | 0  | 1       | 0 |
| 1 | 0 | 0 | 1  | 0  | 0       | 1 |
| 1 | 1 | 1 | 0  | 1  | 0       | 0 |
| 1 | 1 | 0 | 0  | 1  | 0       | 0 |

Figure 5:
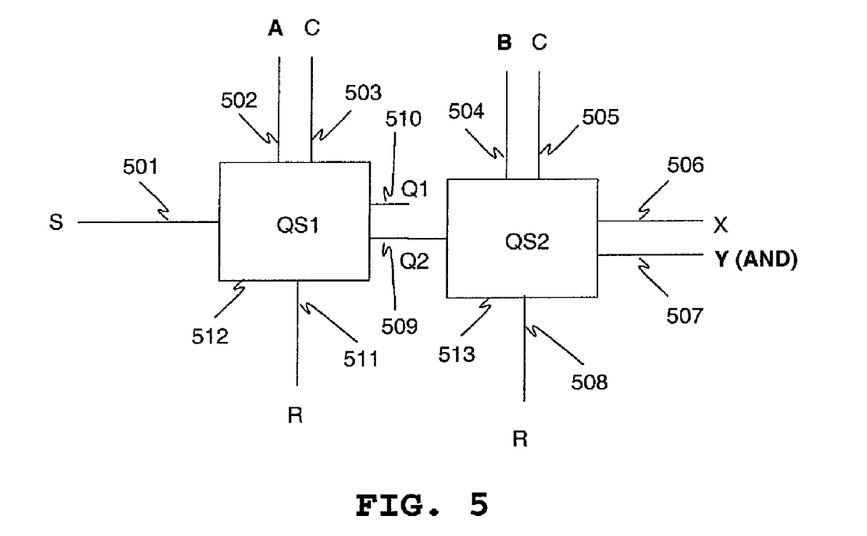

FIG. 5 shows a photon logic gate AND, where the logic gate is composed of two quantum switches connected in series. Here, the output Q2 (509) of the left quantum switch QS1 (512) is fed into the right quantum switch QS2 (513) as an input S (see S in FIG. 1). The combination of two logic input beams A (502) from QS1 and B (504) from QS2 result in Boolean algebra AND to the output Y (507). As mentioned above the laser beam R (511, 508) applied to each quantum switch can be continues wave if Δ≠0. If ΔA=0, however, R must be pulsed and synchronized to the input laser A (502). Both input laser beams A (502) and B (504) must be synchronized, too. TABLE 3 shows a resulting Boolean algebra AND appeared in the output Y (507) according to two logic inputs A (502) and B (504).

TABLE 3

| S | A | B | Q1 | Q2 | X | Y (AND) |
|---|---|---|----|----|---|---------|
| 1 | 0 | 1 | 1  | 0  | 0 | 0       |
| 1 | 0 | 0 | 1  | 0  | 0 | 0       |
| 1 | 1 | 1 | 0  | 1  | 1 | 0       |
| 1 | 1 | 0 | 0  | 1  | 0 | 1       |

Figure 6:
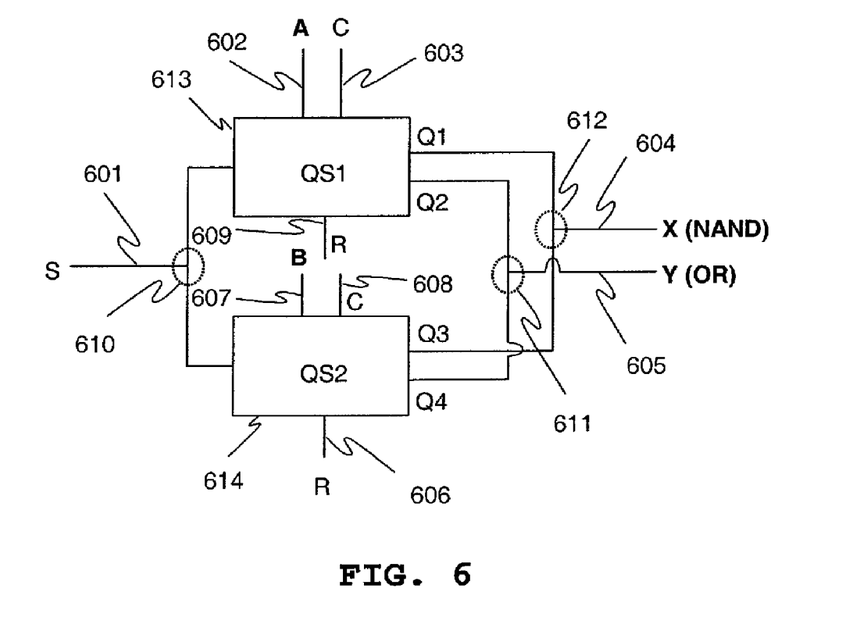
FIG. 6 illustrates a schematic diagram of a photon logic gate, NAND/OR, of the present invention. Letter QS stands for quantum switch and it is comprised of a nonlinear optical medium connected by optical waveguides used for the laser beams R, S, C, A, B, Q1, Q2, Q3, Q4, X, and Y.

FIG. 6 shows a photon logic gate, NAND/OR. The system is composed of two quantum switches connected in parallel, where the source laser S (601) is shared. The output Q1 from the top quantum switch QS1 and Q3 from the bottom quantum switch QS2 is combined together to lead the logic output X (604). The output Q2 and Q4 are combined to lead the logic output Y (605). The read laser beams R (609, 606) are either cw as idlers if the detuning Δ is not zero or synchronized as pulses to the logical input laser beams A (602) and B (607) if the detuning Δ is zero. The source laser beam S (601) is split into two components through an optical splitter/combiner (610, 611, 612) such as a Y branch or a beam splitter. Under the action of two inputs A (602) and B (607), the output logic laser beams X (604) and Y (605) perform Boolean logic operations NAND and OR, respectively: see TABLE 4.

TABLE 4

| S | A | B | Q1 | Q2 | Q3 | Q4 | X (NAND) | Y (OR) |
|---|---|---|----|----|----|----|----------|--------|
| 1 | 0 | 0 | 1  | 0  | 1  | 0  | 1        | 0      |
| 1 | 0 | 1 | 1  | 0  | 0  | 1  | 1        | 1      |
| 1 | 1 | 0 | 0  | 1  | 1  | 0  | 1        | 1      |
| 1 | 1 | 1 | 0  | 1  | 0  | 1  | 0        | 1      |

Figure 7:
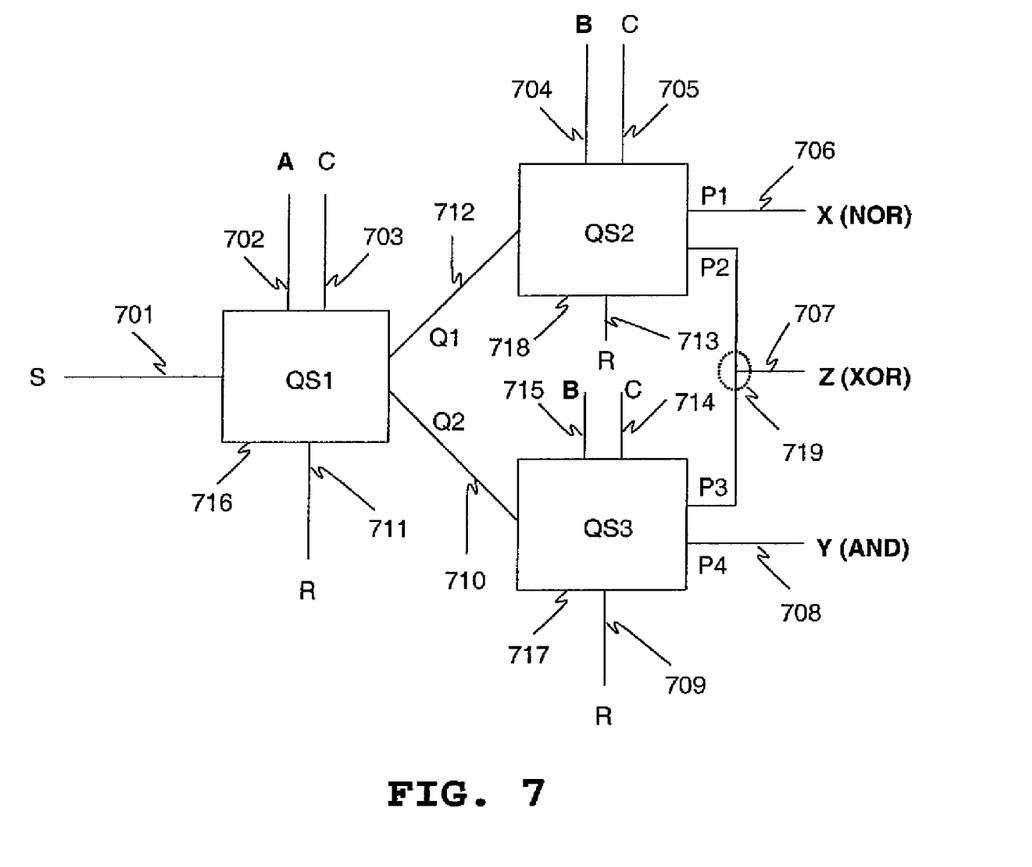
FIG. 7 illustrates a schematic diagram of a photon logic gate, NOR/XOR/AND, of the present invention. Letter QS stands for quantum switch comprised of a nonlinear optical medium connected by optical waveguides used for the laser beams R, S, C, A, B, Q1, Q2, X, Y, and Z.

FIG. 7 shows a photon logic gate, NOR/XOR/AND. The system is composed of three quantum switches, where two of them are connected to the last one. Each output Q1 (712) and Q2 (710) of the quantum switch QS1 (716) are used as an input to the quantum switches QS2 (718) and QS3 (717), respectively. The output P1 (706) is used as a logic output X. The outputs P2 and P3 are combined together (719) to lead the logic output Z (707). The output P4 (708) is used as a logic output Y. There are two logic inputs A (702) and B (704, 715), where A is for the QS1 and B is for both QS2 and QS3. The functions of R (711, 713, 709) and C (703, 705, 714) are the same as discussed above. As seen in TABLE 5, the two logic inputs A and B performs Boolean algebra NOR at the output X, XOR at Z, and AND at Y, simultaneously.

TABLE 5

| S | A | B | Q1 | Q2 | P1 | P2 | P3 | P4 | X (NOR) | Y (AND) | Z (XOR) |
|---|---|---|----|----|----|----|----|----|---------|---------|---------|
| 1 | 0 | 0 | 1  | 0  | 1  | 0  | 0  | 0  | 1       | 0       | 0       |
| 1 | 0 | 1 | 1  | 0  | 0  | 1  | 0  | 0  | 0       | 0       | 1       |
| 1 | 1 | 0 | 0  | 1  | 0  | 0  | 1  | 0  | 0       | 0       | 1       |
| 1 | 1 | 1 | 0  | 1  | 0  | 0  | 0  | 1  | 0       | 1       | 0       |

The invention claimed is:

1. A method of photon logic gates using a single or multiple quantum switches whose nonlinear optical medium is comprised of three closely spaced ground states |1>, |2> and |3> such that the transition among the said ground states is dipole forbidden, and an excited state |4> and |5> such that two-photon transitions between said ground state |1> and said |3>, said |2> and said |3>, and said |1> and said |2> via said excited state |4> (and said excited state |5> if said |5> is real energy state) are allowed, said method comprising following steps:
   a) applying to said nonlinear optical medium a first laser beam as an input beam A through an optical waveguide or free space at a frequency of $\omega_A$ corresponding to a first transition between said ground state |1> and said excited state |4>;
   b) applying a second laser beam C through an optical waveguide or free space at a frequency of $\omega_C$ corresponding to a second transition between said ground state |2> and said excited state |4>;
   c) applying a third laser beam S through an optical waveguide or free space at a frequency of $\omega_S$ corresponding to a third transition between said ground state |3> and said excited state |4>;
   d) applying a fourth laser beam R through an optical waveguide or free space at a frequency of $\omega_R$ corresponding to a third transition between said ground state |3> and said excited state |5>;
   e) adjusting the intensities of said first laser beam A, said second laser beam C, said third laser beam S, and said fourth laser beam R to produce nondegenerate four-wave mixing signals Q1 at a frequency $\omega_{Q1}$, or Q2 at a frequency $\omega_{Q2}$ corresponding to the two-photon coherence induction $[Re\rho_{23}]^2$ or $[Re\rho_{13}]^2$, respectively;
   f) connecting said nondegenerate four-wave mixing signals Q1 and Q2 to optical waveguides physically separated;
   g) connecting two quantum switches in a way to share said S and combine each said Q1 or Q2 together, respectively, via optical waveguides or free space;
   h) connecting two quantum switches in a way to combine nondegenerate four-wave mixing signals Q1 from one quantum switch and Q2 from the other quantum switch;
   i) connecting said Q1 or Q2 of the first quantum switch to said S of the second quantum switch via an optical waveguide or free space;
   j) connecting each said Q1 and Q2 of the first quantum switch to each said S of the second and third quantum switch via an optical waveguide or free space.

2. The method of claim 1 wherein said excited state |4> is selected such that its energy level is higher than the energy level of said ground state |>, said |2>, and said |3>.

3. The method of claim 1 wherein said excited state |5> is selected such that its energy level is separated from said excited state |4> by detuning $\Delta$, where $\Delta$ is 0 or near optical Rabi frequency of said R or A.

4. The method of claim 1 wherein Rabi frequency $\Omega_A$ of said first laser beam A is greater than that of said second laser beam C, and said third laser beam S.

5. The method of claim 1 wherein said first laser beam A, said second laser beam C, said third laser beam S, and said fourth laser beam R are synchronized satisfying said laser beams A, C, and S are overlapped one another temporally, and said fourth laser beam R is time delayed by T shorter than phase decay time $T_2$ among the said three ground states |1>, |2>, and |3> if $\Delta=0$.

6. The method of claim 1 wherein said second laser beam C and said fourth laser beam R are always switched on, and said first laser beam A and said third laser beam S are temporally synchronized, if $\Delta\neq 0$.

7. The method of claim 1 wherein the detuning $\Delta$, energy separation between said energy states |4> and |5> is greater than or similar to the Rabi frequency of said first laser A for the applications of optical router of the quantum switch.

8. The method of claim 1 wherein a single quantum switch is used for Boolean NOT algebra, where said first laser beam controls said third laser beam S to invert it and to produce it into said output Q1.

9. The method of claim 1 wherein serial two quantum switches are used for Boolean NOR algebra, where said output Q1 of the first said nonlinear medium is used as said laser beam S to said second nonlinear medium, and the relation between two said first laser beams A's and said output Q1 of the second said nonlinear medium satisfies Boolean algebra NOR.

10. The method of claim 1 wherein serial two quantum switches are used for Boolean algebra AND, where said output Q2 of the first said nonlinear medium is used as said laser beam S to said second nonlinear medium, and the relation between two said first laser beams A's and said output Q2 of the second said nonlinear medium satisfies Boolean algebra AND.

11. The method of claim 1 wherein parallel two-quantum switches are used for Boolean NAND/OR algebra, where said laser beam S is shared by two said nonlinear media and each said output Q1's and Q2's are combined, respectively, so that the relation between two said first laser beams A's applying to each said nonlinear medium and each said combined outputs Q1's and Q2's satisfies Boolean algebra NAND and OR, respectively.

12. The method of claim 1 wherein three quantum switches are connected one another to satisfy Boolean NOR/XOR/AND algebra, where said Q1 and Q2 of the first quantum switch is used for said S for both parallel quantum switches, and each said output Q2 and Q1 from the parallel quantum switches are combined for Z, respectively, so that the relation between three laser beams said A's applying to each said nonlinear media and said outputs Q1, Q2, and Z satisfies Boolean algebra NOR, AND, and XOR, respectively.

13. An apparatus for photon logic gates using a single or multiple nonlinear optical medium composing three ground states |>, |2>, |3> such that the transition between said ground states |1> and |2>, |1> and |3>, and |2> and |3> are dipole forbidden, and an excited state |4> such that two-photon transition between said ground states |1> and |2>, |1> and |3>, and |2> and |3> via said excited state |4> is allowed, said apparatus comprising:
   a) a first laser beam source for applying to said nonlinear optical medium said first laser beam A at a frequency of $\omega_A$ corresponding to a first transition between said ground state |1> and said excited state |4>;

b) a second laser beam source for applying to said nonlinear optical medium a second beam C at a frequency of $\omega_C$ corresponding to a second transition between said ground state |2> and said excited state |4>;

c) a third laser beam source for applying to said nonlinear optical medium a third beam S at a frequency of $\omega_S$ corresponding to a third transition between said ground state |3> and said excited state |4>;

d) a fourth laser beam source for applying to said nonlinear optical medium a fourth beam R at a frequency of $\omega_R$ corresponding to a fourth transition between said ground state |3> and said excited state |5>, either said excited state |5> is real or virtual;

e) a means for splitting a third laser beam S from said third laser beam into two or multiple beams for applying to each said nonlinear optical medium at a frequency of $\omega_S$ corresponding to a third transition between said ground state |3> and said excited state |4>;

f) a means for combining said nondegenerate four-wave mixing signals Q1 and Q2 from multiple nonlinear optical media into corresponding optical channels, respectively;

g) a means for adjusting the intensities and the frequencies of said first beam, said second beam, said third beam, and said fourth beam to produce coherent superposition state of said ground state |1> and said |2>, said |1> and said |3>, and said |2> and |3>;

h) a means for synchronizing or delaying a first laser beam A, a third laser beam S, and four laser beam R one another;

i) A means for spatially overlapping a first laser beam A, a second laser beam C, a third laser beam S, and a fourth laser beam R inside a nonlinear optical medium.

14. The apparatus of claim 13 wherein said nonlinear optical medium is a solid.

15. The apparatus of claim 13 wherein said nonlinear optical medium is multiply coupled semiconductors.

16. The apparatus of claim 15 in which said three ground states |1>, |2> and |3>, and said excited states |4> and |5> are selected in conduction band of said multiply coupled semiconductor.

17. The apparatus of claim 13 in which said nonlinear optical medium is connected via optical waveguides, free space, or plasmon waveguides to guide said laser beams A, C, S, R, Q1, and/or Q2.

18. The apparatus of claim 13, where said first laser beam A acts on said third laser beam S to produce said output Q1 for the Boolean NOT algebra.

19. The apparatus of claim 13, where said nonlinear medium is connected in which said output Q1 of the first nonlinear medium to be fed into said second nonlinear medium as a said third laser beam S, and the relation between two first laser beams A's applying to each said nonlinear medium and said output Q1 of said second nonlinear medium satisfies the Boolean algebra NOR.

20. The apparatus of claim 13, where said nonlinear medium is connected in which said output Q2 of the first nonlinear medium to be fed into said second nonlinear medium as a said third laser beam S, and the relation between two first laser beams A's applying to each said nonlinear medium and said output Q2 of said second nonlinear medium satisfies the Boolean algebra AND.

21. The apparatus of claim 13, where said third laser S is shared by two nonlinear media each said outputs Q1 and Q2 are combined together, and results satisfy the Boolean algebra NAND and OR, respectively, for two said first laser beams A of each nonlinear media.

22. The apparatus of claim 13, where three said nonlinear media are connected in a way that said both outputs Q1 and Q2 from said one nonlinear medium used for the third laser S of the said rest two nonlinear media, said outputs Q1 and Q2 are combined together, so that three outputs satisfy the Boolean algebra NOR, XOR, and AND, respectively.

* * * * *